US010413823B1

(12) United States Patent
Godbole et al.

(10) Patent No.: US 10,413,823 B1
(45) Date of Patent: Sep. 17, 2019

(54) SYSTEM AND METHOD FOR PROVIDING AN INTUITIVE INTERFACE FOR UPGRADING A VIRTUAL ITEM IN A VIRTUAL SPACE (75) Inventors: Priyanka Godbole, Fremont, CA (US); Sam Lu, San Leandro, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 870 days.

(21) Appl. No.: 13/432,828

(22) Filed: Mar. 28, 2012

(51) Int. Cl.
*G06F 3/048* (2013.01)
*A63F 13/46* (2014.01)
*G06F 3/0484* (2013.01)
*A63F 13/45* (2014.01)

(52) U.S. Cl.
CPC .............. *A63F 13/46* (2014.09); *A63F 13/45* (2014.09); *G06F 3/048* (2013.01); *G06F 3/0484* (2013.01); *A63F 2300/55* (2013.01)

(58) Field of Classification Search
CPC ............. A63F 13/12; A63F 2300/5553; G06F 3/04815; G06F 3/011; H04L 29/06034
USPC ........................................ 715/757, 782, 764
See application file for complete search history.

(56) References Cited

U.S. PATENT DOCUMENTS

| | | | |
|---|---|---|---|
| 6,831,659 B1* | 12/2004 | Mukoyama et al. | 345/619 |
| 7,867,093 B2 | 1/2011 | Wright | 463/42 |
| 8,002,623 B2 | 8/2011 | Resnick et al. | 463/19 |
| 8,523,650 B2* | 9/2013 | Kelly et al. | 463/16 |
| 2008/0163055 A1* | 7/2008 | Ganz et al. | 715/706 |
| 2008/0263452 A1 | 10/2008 | Tomkins | 715/730 |
| 2009/0125383 A1* | 5/2009 | Jung et al. | 705/10 |
| 2013/0130762 A1* | 5/2013 | John et al. | 463/9 |

OTHER PUBLICATIONS

Calin, "Guide for the CityVille Video Game Store Upgrade", Jul. 27, 2011, http://www.cityvilleinfo.com/guide-for-the-cityville-video-game-store-upgrade/, pp. 1-4.*
Webkinz article, 360Blog, Apr. 27, 2009, http://www.360kid.com/blog/2009/04/, pp. 2-4.*
"How to Feed a Webkinz Pet", wikiHow, Mar. 27, 2009, www.wikihow.com/Feed-a-Webkinz-Pet, pp. 1-2.*
momskinz, "Webkinz Wednesday Updates", Nov. 26, 2008, http://www.thelamberts.com/webkinz_blog/?p=5651, p. 1.*
Osborne, Joe, "Empires & Allies Research Lab: Everything You Need to Know", <http://blog.games.com/2011/06/04/empires-allies-research-labs/>, posted Jun. 24, 2011 (printed Nov. 11, 2011), 2 pages.

(Continued)

*Primary Examiner* — Joy M Weber
(74) *Attorney, Agent, or Firm* — Knobbe, Martens, Olson & Bear, LLP (57) ABSTRACT

An upgrade interface configured for upgrading a virtual item is provided. The upgrade interface receives selection by the user that results in incrementing and/or de-incrementing the current item level. Display panels are provided with individual display panels corresponding to individual levels of the virtual item. The individual display panels may have an active state and an inactive state. In some implementations, only one of the display panels may be in the active state at a given time such that responsive to one of the display panels in the inactive state being selected the selected display panel enters the active state.

18 Claims, 5 Drawing Sheets

(56) References Cited

OTHER PUBLICATIONS

"Farm Upgrade—FarmVille Wiki—Seeds, Animals, Buildings, Events, Mys . . . ", <http://farmville.wikia.com/wiki/Farm_Upgrade>, printed Nov. 11, 2011, 4 pages.

"Mafia Wars 2 Guide: How to Build High Grade Buildings Quickly", <http://www.bbgsite.com/socialgames/content/mafia-wars-2/guuide/mafia-wars-2-guide-how-to-build-high-grade-buildings-quickly.shtml>, printed Nov. 11, 2011, 2 pages.

\* cited by examiner

SYSTEM AND METHOD FOR PROVIDING AN INTUITIVE INTERFACE FOR UPGRADING A VIRTUAL ITEM IN A VIRTUAL SPACE

FIELD OF THE DISCLOSURE

This disclosure relates to providing an intuitive interface configured for upgrading a virtual item.

BACKGROUND

Upgrading virtual items in a virtual space is known. Existing systems, however, typically fail to provide an intuitive interface for managing information associated with upgrading virtual items.

SUMMARY

One aspect of the disclosure relates to a system configured to provide a virtual space, in accordance with one or more implementations. Virtual items existing in the virtual space may be upgradeable and/or downgradeable such that benefits associated with individual virtual items and realized by users in the virtual space may be incrementally changed to different levels. An intuitive upgrade interface may be provided to manage virtual item upgrades/downgrades and/or other information associated with the virtual items. Providing the virtual space may include hosting the virtual space over a network. In some implementations, the system may include a server. The server may be configured to communicate with one or more client computing platforms according to a client/server architecture. The users may access system and/or the virtual space via the client computing platforms.

The server may be configured to execute one or more computer program modules. The computer program modules may include one or more of a user module, a space module, an interaction module, a relationship module, an item level module, an item upgrade module, an upgrade interface module, and/or other modules.

The user module may be configured to access and/or manage one or more user profiles and/or user information associated with users of the system.

The space module may be configured to implement the instance of the virtual space executed by the computer modules to determine views of the virtual space. The views may then be communicated (e.g., via streaming, via object/position data, and/or other information) from the server to the client computing platforms for presentation to users. Within the instance(s) of the virtual space executed by the space module, users may control characters, objects, simulated physical phenomena (e.g., wind, rain, earthquakes, and/or other phenomena), and/or other elements within the virtual space to interact with the virtual space and/or each other. The user may have an "inventory" of virtual goods and/or currency that the user can use (e.g., by manipulation of a user character or other user controlled element, and/or other items) within the virtual space.

The interaction module may be configured to monitor interactions of the users with the virtual space and/or each other within the virtual space.

The relationship module may be configured to establish relationships between users within the virtual space. Such relationships may include one or more of friendships, guilds (with guild-mates), alliances, connections, followers, and/or other relationships.

The item level module may be configured to manage a virtual item that exists within the virtual space. According to various implementations, the virtual item may include one or more of a virtual building or facility, a virtual weapon, a piece of virtual equipment, a virtual mount, and/or other virtual items. The virtual item may be associated with the user. The virtual item may provide the user with a benefit within the virtual space. Examples of benefits may include facilitating one or more of healing of a virtual character, constructing a virtual building or facility, enhancing destructiveness of a virtual weapon, enhancing protection provided by a piece of virtual equipment, and/or other benefits that may be realized by the user in the virtual space.

The virtual item may have discrete item levels where a benefit parameter of the benefit provided by the virtual item varies as a function of a current item level of the virtual item. The benefit parameter may comprise one or more of a rate at which the benefit is provided and/or accrues to the user in the virtual space, an impact on a cost of the benefit to the user in the virtual space, an effectiveness of the benefit in the virtual space, and/or other parameters associated with benefits in the virtual space. The item level module may be configured to track the current item level of the virtual item. The item level module may be configured to ensure that the benefit is provided to the user in accordance with the current item level of the virtual item.

The item upgrade module may be configured to increment and/or de-increment the current item level of the virtual item based on user selection. According to some implementations, the item upgrade module may be configured such that incrementing the current item level of the virtual item comprises obtaining a virtual cost, as described further herein. An increment and/or a de-increment of the current item level of the virtual item may occur over a period of time. The period of time may be pre-determined. In some implementations, the period of time may be shortened by user selection and/or by paying an associated virtual cost. In some implementations, a virtual item may be destroyed rather than being incremented and/or de-incremented. Destroying a virtual item may result in a virtual refund to the user. The virtual refund may be in a similar form as virtual costs described herein.

The upgrade interface module may be configured to generate information causing presentation of an upgrade interface to the user. The upgrade interface may be presented to the user via one of the client computing platforms. The upgrade interface may present a series of display panels with individual display panels corresponding to individual levels of the virtual item. The upgrade interface module may be configured such that the display panels correspond to a current item level and a series of item levels associated with levels of the benefit parameter that cause the benefit to be provided and/or accrue to the user at a greater rate than the level of the benefit parameter associated with the current item level. The upgrade interface may be configured to receive selection by the user that results in incrementing and/or de-incrementing the current item level by the item upgrade module.

In accordance with some implementations, individual display panels of the upgrade interface may have an active state and an inactive state. According to some implementations, only one of the display panels may be in the active state at a given time. A given display panel may present different information in the active state relative to the inactive state. A display panel corresponding to a current item level, a next item level, some future item level, some past item level, or other item level may be in either the active state or the inactive state.

Responsive to a given display panel in the inactive state being selected, the selected display panel may enter the active state. A transition from the inactive state to the active state by a given display panel may cause presentation of various information in the given display panel. For example, responsive to a transition to the active state, the given display panel may present a field configured to receive user selection resulting in incrementing and/or de-incrementing the current item level by the item upgrade module. As another example, responsive to a transition to the active state, the given display panel may present a level of the benefit parameter associated with the item level that corresponds to the given display panel.

In some implementations, for a display panel corresponding to a current item level, a transition from the inactive state to the active state may cause presentation in the display panel of a field configured to receive user selection resulting in the virtual item being destroyed. Destroying a virtual item may result in a virtual refund to the user. According to some implementations, a transition from the inactive state to the active state for a display panel corresponding to a current item level may cause presentation in the display panel of a virtual refund for destroying the virtual item. The upgrade interface module may be configured such that the display panel corresponding to the current item level facilitates selection by the user of receiving a virtual refund in one or more of virtual currency, virtual goods, and/or other means of refund.

For a display panel corresponding to a next item level adjacent to the current item level, a transition from the inactive state to the active state may cause presentation in the display panel of a virtual cost for incrementing the item level of the virtual item from the current item level to the next item level. As mentioned above, the item upgrade module may be configured such that incrementing the current item level of the virtual item comprises obtaining the virtual cost. According to some implementations, the virtual cost may be payable in one or more of time, virtual currency, virtual goods, and/or other means of payment. Paying virtual cost with time may include having to wait for a period of time to elapse before an incremental upgrade and/or downgrade is complete. The upgrade interface module may be configured such that the display panel corresponding to the next item level facilitates selection by the user of paying the virtual cost in one or more of time, virtual currency, virtual goods, and/or other means of payment.

As mentioned above, an increment and/or a de-increment of the current item level of the virtual item may occur over a period of time. In order to facilitate shortening that period of time, the upgrade interface module may be configured such that, for a display panel corresponding to a next item level adjacent to the current item level, a transition from the inactive state to the active state may cause presentation in the display panel of a virtual cost associated with shortening the period of time during which the current item level of the virtual item is incremented and/or de-incremented. Accordingly, for a display panel corresponding to a next item level adjacent to the current item level, a transition from the inactive state to the active state may cause presentation in the display panel of a field configured to receive user selection resulting in shortening the period of time associated with incrementing and/or de-incrementing the current item level of the virtual item, in some implementations.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
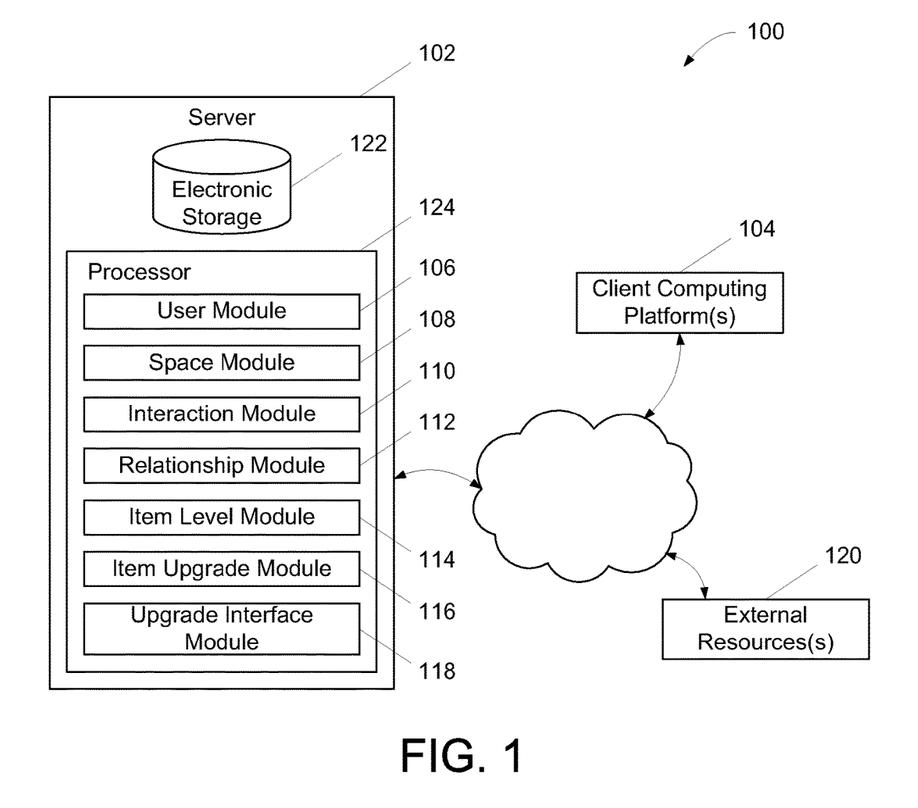
FIG. 1 illustrates a system configured to provide a virtual space, in accordance with one or more implementations.

FIG. 1 illustrates a system 100 configured to provide a virtual space, in accordance with one or more implementations. Virtual items existing in the virtual space may be upgradeable and/or downgradeable such that benefits associated with individual virtual items and realized by users in the virtual space may be incrementally changed to different levels. An intuitive upgrade interface may be provided to manage virtual item upgrades/downgrades and/or other information associated with the virtual items. Providing the virtual space may include hosting the virtual space over a network. In some implementations, system 100 may include a server 102. The server 102 may be configured to communicate with one or more client computing platforms 104 according to a client/server architecture. The users may access system 100 and/or the virtual space via client computing platforms 104.

The server 102 may be configured to execute one or more computer program modules. The computer program modules may include one or more of a user module 106, a space module 108, an interaction module 110, a relationship module 112, an item level module 114, an item upgrade module 116, an upgrade interface module 118, and/or other modules.

The user module 106 may be configured to access and/or manage one or more user profiles and/or user information associated with users of the system 100. The one or more user profiles and/or user information may include information stored by server 102, one or more of the client computing platforms 104, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users.

The space module 108 may be configured to implement the instance of the virtual space executed by the computer modules to determine views of the virtual space. The views may then be communicated (e.g., via streaming, via object/position data, and/or other information) from server 102 to client computing platforms 104 for presentation to users. The view determined and transmitted to a given client computing platform 104 may correspond to a user character being controlled by a user via the given client computing platform 104. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platforms 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are determined by space module 108 is not intended to be limiting. The space module 108 may be configured to express the virtual space in a more limited, or more rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space module 108, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 104. The users may interact with each other through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server 102 (e.g., through space module 108).

The interaction module 110 may be configured to monitor interactions of the users with the virtual space and/or each other within the virtual space. This may include monitoring, for a given user, one or more of times at which the given user is logged in to the virtual space, areas of the virtual space the given user views or interacts with or in, other users the given user interacts with, the nature and/or content of interactions of the given user with other users, activities participated in within the virtual space, level, powers, or skill attained in the virtual space, inventory items obtained in the virtual space, and/or other interactions of the given user with the virtual space and/or other users. Some or all of the information generated by interaction module 110 in monitoring the interactions of the users may be stored to the user profiles managed by user module 106.

At a given time, interaction module 110 may determine a set of users that are currently engaged with the virtual space and/or a set of users that are currently not engaged with the virtual space. Being engaged with the virtual space may refer to being logged in to the virtual space, performing some action or interaction within the virtual space within some period of time (e.g., the last 2 minutes), and/or other taking some other action indicating ongoing and contemporaneous engagement with the virtual space.

The interaction module 110 may be configured to determine, for individual users, an activity metric that indicates an activity level within the virtual space. The activity metric may be determined based on one or more of log in frequency, amount of time logged in to the virtual space within a rolling time period (e.g., over the last day, week, month, or other rolling time period), average amount of time logged in to the virtual space over some length of time (e.g., per day, per week, and/or other length of time), average log in session time over a rolling time period, number of inter-user communications over a length of time, number of inter-user communications per log in, number of relationships with other users in the virtual space, number of new relationships with other users in the virtual space within a rolling time period, amount of real world money spent in the virtual space, and/or other activity parameters.

The relationship module 112 may be configured to establish relationships between users within the virtual space. Such relationships may include one or more of friendships, guilds (with guild-mates), alliances, connections, followers, and/or other relationships. The relationship module 112 may establish relationships based on relationship requests and acceptances received from users. Establishment of a relationship may be initiated by a single communication (e.g., a request) initiated by a given user requesting a relationship between the given user and one or more other users. Establishment of a relationship may require a first communication from the given user to be approved by the one or more other users. Relationships may include one or more types of relationships that have a functional purpose or impact within the virtual space, and/or one or more types of relationships that a social construct within the virtual space that does not have a functional result.

The item level module 114 may be configured to manage a virtual item that exists within the virtual space. According to various implementations, the virtual item may include one or more of a virtual building or facility, a virtual weapon, a piece of virtual equipment, a virtual mount, and/or other virtual items. The virtual item may be associated with the user. The virtual item may provide the user with a benefit within the virtual space. Examples of benefits may include facilitating one or more of healing of a virtual character, constructing a virtual building or facility, enhancing destructiveness of a virtual weapon, enhancing protection provided by a piece of virtual equipment, and/or other benefits that may be realized by the user in the virtual space.

The virtual item may have discrete item levels where a benefit parameter of the benefit provided by the virtual item varies as a function of a current item level of the virtual item. The benefit parameter may comprise one or more of a rate at which the benefit is provided and/or accrues to the user in the virtual space, an impact on a cost of the benefit to the user in the virtual space, an effectiveness of the benefit in the virtual space, and/or other parameters associated with benefits in the virtual space. The item level module 114 may be configured to track the current item level of the virtual item. The item level module 114 may be configured to ensure that the benefit is provided to the user in accordance with the current item level of the virtual item.

The item upgrade module 116 may be configured to increment and/or de-increment the current item level of the virtual item based on user selection. According to some implementations, item upgrade module 116 may be configured such that incrementing the current item level of the virtual item comprises obtaining a virtual cost, as described further herein. An increment and/or a de-increment of the current item level of the virtual item may occur over a period of time. The period of time may be pre-determined. In some implementations, the period of time may be shortened by user selection and/or by paying an associated virtual cost. In some implementations, a virtual item may be destroyed rather than being incremented and/or de-incremented. Destroying a virtual item may result in a virtual refund to the user. The virtual refund may be in a similar form as virtual costs described herein.

The upgrade interface module 118 may be configured to generate information causing presentation of an upgrade interface to the user. The upgrade interface may be presented to the user via one of client computing platforms 104. The upgrade interface may present a series of display panels with individual display panels corresponding to individual levels of the virtual item. The upgrade interface module 118 may be configured such that the display panels correspond to a current item level and a series of item levels associated with levels of the benefit parameter that cause the benefit to be provided and/or accrue to the user at a greater rate than the level of the benefit parameter associated with the current item level. The upgrade interface may be configured to receive selection by the user that results in incrementing and/or de-incrementing the current item level by item upgrade module 116.

In accordance with some implementations, individual display panels of the upgrade interface may have an active state and an inactive state. According to some implementations, only one of the display panels may be in the active state at a given time. A given display panel may present different information in the active state relative to the inactive state. A display panel corresponding to a current item level, a next item level, some future item level, some past item level, or other item level may be in either the active state or the inactive state.

Responsive to a given display panel in the inactive state being selected, the selected display panel may enter the active state. A transition from the inactive state to the active state by a given display panel may cause presentation of various information in the given display panel. For example, responsive to a transition to the active state, the given display panel may present a field configured to receive user selection resulting in incrementing and/or de-incrementing the current item level by the item upgrade module 116. As another example, responsive to a transition to the active state, the given display panel may present a level of the benefit parameter associated with the item level that corresponds to the given display panel.

In some implementations, for a display panel corresponding to a current item level, a transition from the inactive state to the active state may cause presentation in the display panel of a field configured to receive user selection resulting in the virtual item being destroyed. Destroying a virtual item may result in a virtual refund to the user. According to some implementations, a transition from the inactive state to the active state for a display panel corresponding to a current item level may cause presentation in the display panel of a virtual refund for destroying the virtual item. The upgrade interface module 118 may be configured such that the display panel corresponding to the current item level facilitates selection by the user of receiving a virtual refund in one or more of virtual currency, virtual goods, and/or other means of refund.

For a display panel corresponding to a next item level adjacent to the current item level, a transition from the inactive state to the active state may cause presentation in the display panel of a virtual cost for incrementing the item level of the virtual item from the current item level to the next item level. As mentioned above, item upgrade module 116 may be configured such that incrementing the current item level of the virtual item comprises obtaining the virtual cost. According to some implementations, the virtual cost may be payable in one or more of time, virtual currency, virtual goods, and/or other means of payment. Paying virtual cost with time may include having to wait for a period of time to elapse before an incremental upgrade and/or downgrade is complete. The upgrade interface module 118 may be configured such that the display panel corresponding to the next item level facilitates selection by the user of paying the virtual cost in one or more of time, virtual currency, virtual goods, and/or other means of payment.

As mentioned above, an increment and/or a de-increment of the current item level of the virtual item may occur over a period of time. In order to facilitate shortening that period of time, upgrade interface module 118 may be configured such that, for a display panel corresponding to a next item level adjacent to the current item level, a transition from the inactive state to the active state may cause presentation in the display panel of a virtual cost associated with shortening the period of time during which the current item level of the virtual item is incremented and/or de-incremented. Accordingly, for a display panel corresponding to a next item level adjacent to the current item level, a transition from the inactive state to the active state may cause presentation in the display panel of a field configured to receive user selection resulting in shortening the period of time associated with incrementing and/or de-incrementing the current item level of the virtual item, in some implementations.

In some implementations, server 102, client computing platforms 104, and/or external resources 120 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server 102, client computing platforms 104, and/or external resources 120 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 120, and/or provide other functionality attributed herein to client computing platforms 104. By way of non-limiting example, the given client computing platform 104 may include one or more of a desktop computer, a laptop computer, a handheld computer, a NetBook, a Smartphone, a gaming console, and/or other computing platforms.

The external resources 120 may include sources of information, hosts and/or providers of virtual environments outside of system 100, external entities participating with system 100, and/or other resources. In some implementations, some or all of the functionality attributed herein to external resources 120 may be provided by resources included in system 100.

The server 102 may include electronic storage 122, one or more processors 124, and/or other components. The server 102 may include communication lines, or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed to server 102. For example, server 102 may be implemented by a cloud of computing platforms operating together as server 102.

Electronic storage 122 may comprise electronic storage media that electronically stores information. The electronic storage media of electronic storage 122 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor 124, information received from server 102, information received from client computing platforms 104, and/or other information that enables server 102 to function as described herein.

Processor(s) 124 is configured to provide information processing capabilities in server 102. As such, processor 124 may include one or more of a digital processor, an analog processor, a digital circuit designed to process information, an analog circuit designed to process information, a state machine, and/or other mechanisms for electronically processing information. Although processor x is shown in FIG. 1 as a single entity, this is for illustrative purposes only. In some implementations, processor 124 may include a plurality of processing units. These processing units may be physically located within the same device, or processor 124 may represent processing functionality of a plurality of devices operating in coordination. The processor 124 may be configured to execute modules 106, 108, 110, 112, 114, 116, 118, and/or other modules. Processor 124 may be configured to execute modules 106, 108, 110, 112, 114, 116, 118, and/or other modules by software; hardware; firmware; some combination of software, hardware, and/or firmware; and/or other mechanisms for configuring processing capabilities on processor 124.

It should be appreciated that although modules 106, 108, 110, 112, 114, 116, and 118 are illustrated in FIG. 1 as being co-located within a single processing unit, in implementations in which processor 124 includes multiple processing units, one or more of modules 106, 108, 110, 112, 114, 116, and/or 118 may be located remotely from the other modules. The description of the functionality provided by the different modules 106, 108, 110, 112, 114, 116, and/or 118 described herein is for illustrative purposes, and is not intended to be limiting, as any of modules 106, 108, 110, 112, 114, 116, and/or 118 may provide more or less functionality than is described. For example, one or more of modules 106, 108, 110, 112, 114, 116, and/or 118 may be eliminated, and some or all of its functionality may be provided by other ones of modules. As another example, processor 124 may be configured to execute one or more additional modules that may perform some or all of the functionality attributed below to one of modules 106, 108, 110, 112, 114, 116, and/or 118.

Figure 2:
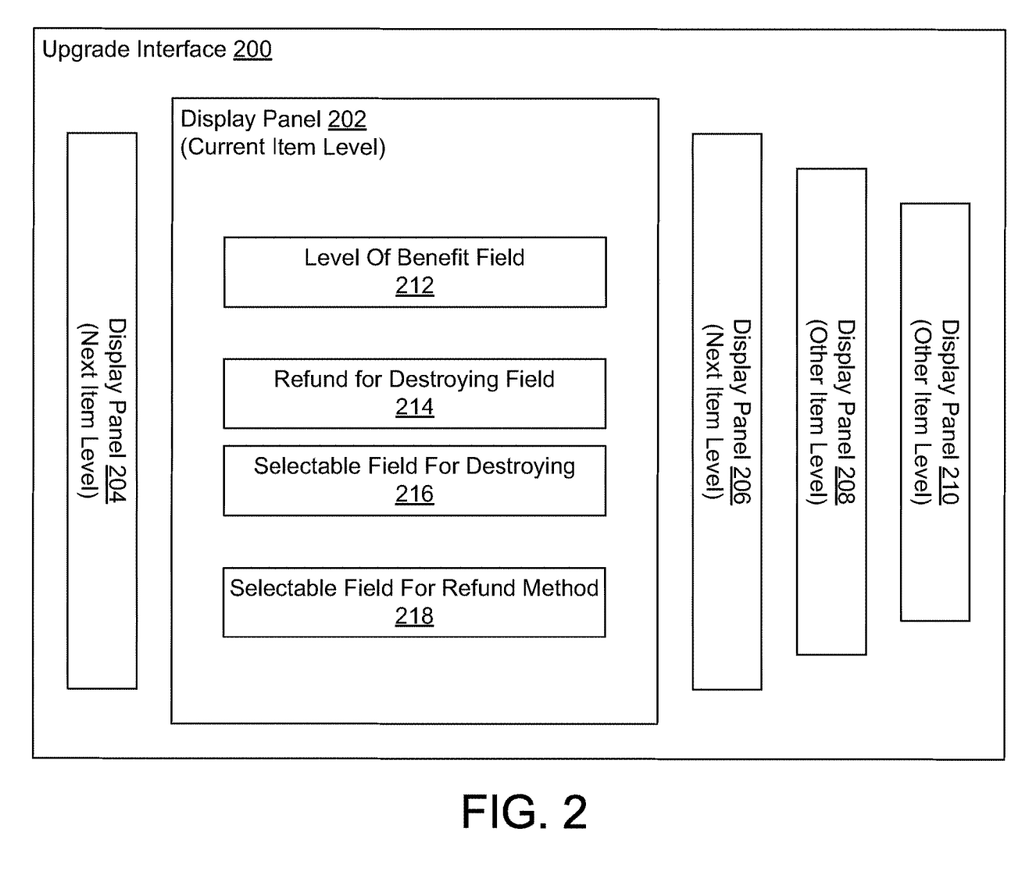
FIG. 2 illustrates an upgrade interface configured to enable a user to manage upgrading a virtual item, wherein the upgrade interface may present a display panel in the active state corresponding to the current item level of the virtual item, in accordance with one or more implementations.

FIG. 2 illustrates an upgrade interface 200 configured to enable a user to manage upgrading a virtual item, wherein upgrade interface 200 may present a display panel 202 in the active state corresponding to the current item level of the virtual item, in accordance with one or more implementations. As depicted in FIG. 2, upgrade interface 200 also may present one or more display panels in the inactive state corresponding to one or two next item levels (display panels 204 and 206) and/or other item levels (display panels 208 and 210) besides the current item level. The upgrade interface 200 may be presented to the user via a client computing platform 104 associated with the user. The upgrade interface 200 may be presented within a virtual space provided by server 102, another virtual space, and/or outside of a virtual space. The upgrade interface 200 may be provided by upgrade interface module 118 and/or other modules of system 100. The depiction of user interface 200 in FIG. 2 is not intended to be limiting as user interface 200 may include more or less elements than those shown.

As depicted in FIG. 2, display panel 202 may include one or more of a level of benefit field 212, a refund for destroying field 214, a selectable field for destroying 216, a selectable field for refund method 218, and/or other elements. The level of benefit field 212 may be configured to present a level of the benefit parameter associated with the item level that corresponds to display panel 202. The refund for destroying field 214 may be configured to present virtual refund for destroying the virtual item associated with upgrade interface 200. The selectable field for destroying 216 may be configured to receive a user selection resulting in the virtual item associated with upgrade interface 200 being destroyed. The selectable field for refund method 218 may be configured to receive a user selection of receiving the virtual refund in virtual goods or virtual currency.

Figure 3:
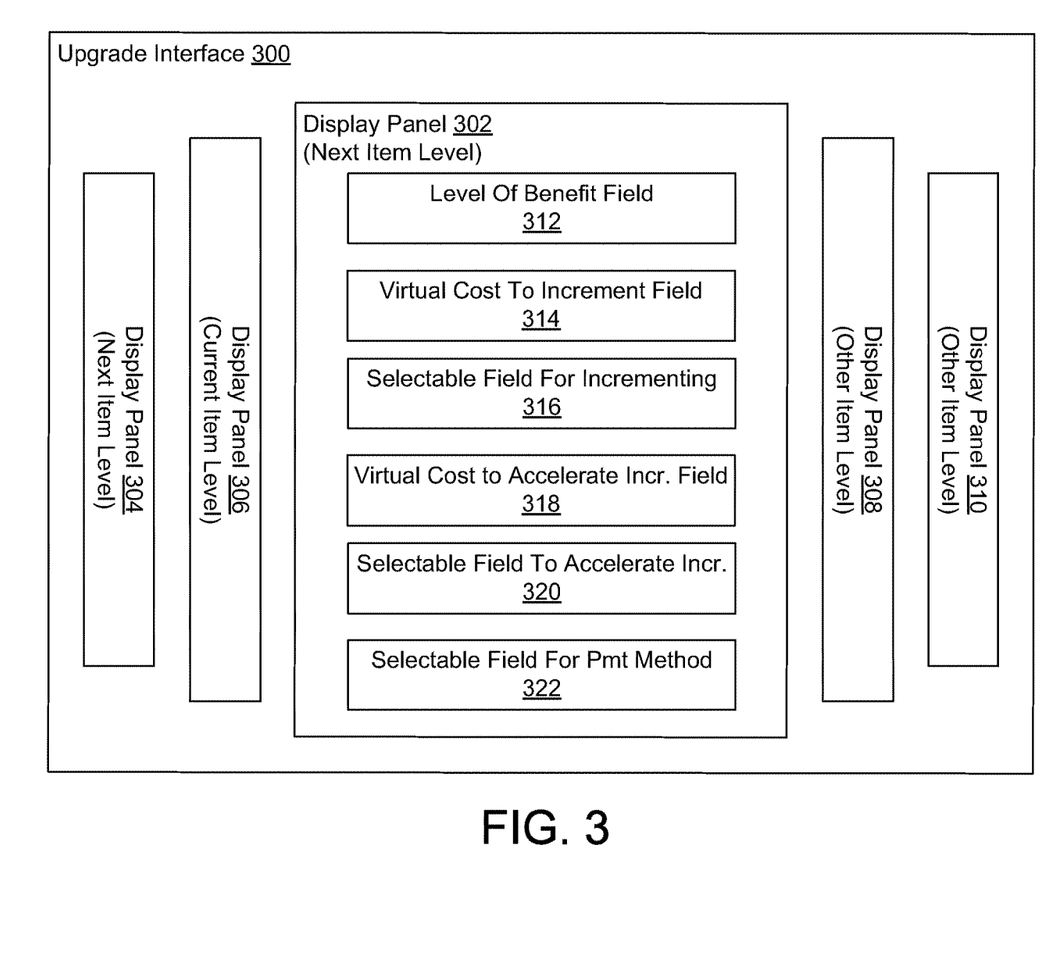
FIG. 3 illustrates an upgrade interface configured to enable a user to manage upgrading a virtual item, wherein the upgrade interface may present a display panel in the active state corresponding to the next item level of the virtual item, in accordance with one or more implementations.

FIG. 3 illustrates an upgrade interface 300 configured to enable a user to manage upgrading a virtual item, wherein the upgrade interface 300 may present a display panel 302 in the active state corresponding to the next item level of the virtual item, in accordance with one or more implementations. As depicted in FIG. 3, upgrade interface 300 also may present one or more display panels in the inactive state corresponding to another next item level (display panel 304), a current item level (display panel 306), and/or other item levels (display panels 308 and 310) besides the current item level. The upgrade interface 300 may be presented to the user via a client computing platform 104 associated with the user. The upgrade interface 300 may be presented within a virtual space provided by server 102, another virtual space, and/or outside of a virtual space. The upgrade interface 300 may be provided by upgrade interface module 118 and/or other modules of system 100. The depiction of user interface 300 in FIG. 3 is not intended to be limiting as user interface 300 may include more or less elements than those shown.

As depicted in FIG. 3, display panel 302 may include one or more of a level of benefit field 312, a virtual cost to increment field 314, a selectable field for incrementing 316, a virtual cost to accelerate incrementing field 318, a selectable field to accelerate incrementing 320, a selectable field for payment method 322, and/or other elements. The level of benefit field 312 may be configured to present a level of the benefit parameter associated with the item level that corresponds to display panel 302. The virtual cost to increment field 314 may be configured to present a virtual cost for incrementing the item level of the virtual item from the current item level to the next item level. The selectable field for incrementing 316 may be configured to receive a user selection resulting in incrementing and/or de-incrementing the current item level by the item upgrade module 116. The virtual cost to accelerate incrementing field 318 may be configured to present a virtual cost associated with shortening the period of time during which the current item level of the virtual item is incremented and/or de-incremented. The selectable field to accelerate incrementing 320 may be configured to receive a user selection resulting in shortening the period of time associated with incrementing and/or de-incrementing the current item level of the virtual item. The selectable field for payment method 322 may be configured to receive a user selection of paying the virtual cost in time or virtual currency.

Figure 4:
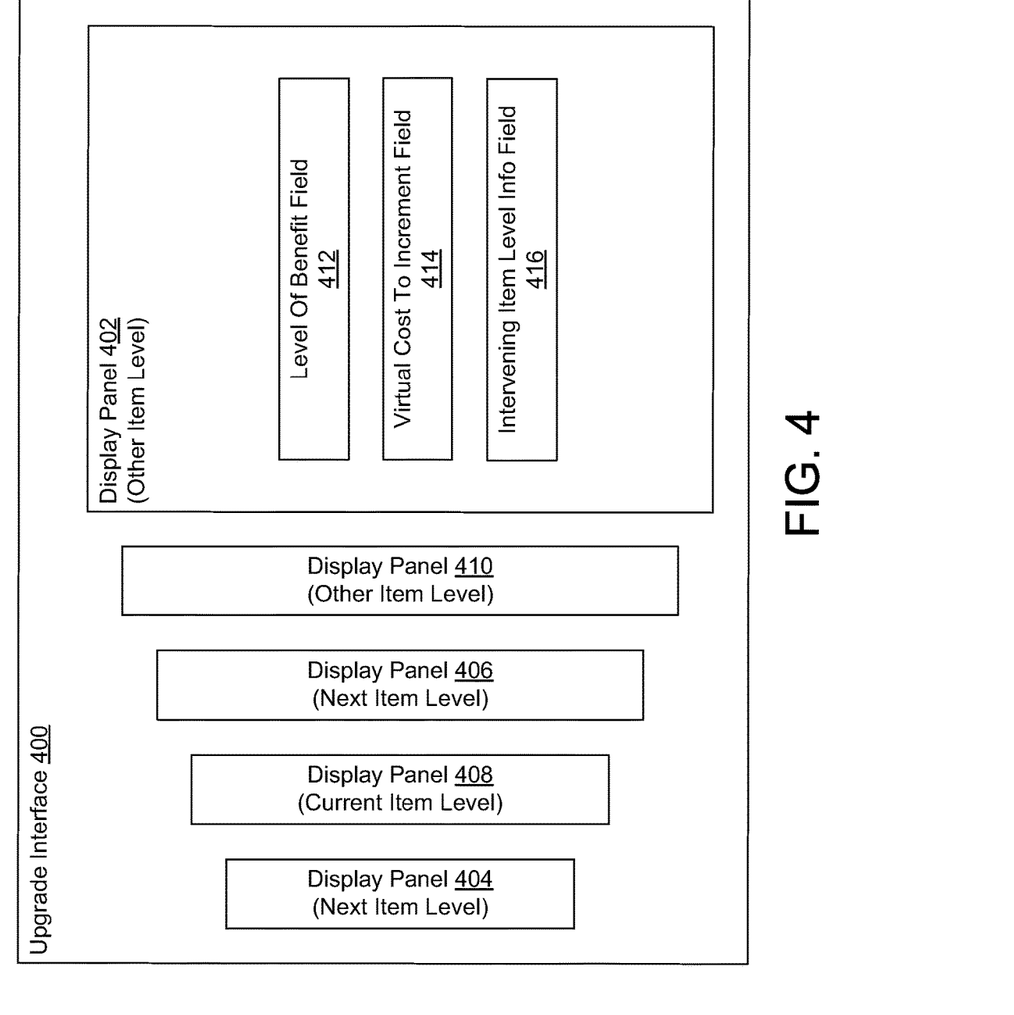
FIG. 4 illustrates an upgrade interface configured to enable a user to manage upgrading a virtual item, wherein the upgrade interface may present a display panel in the active state corresponding to some other item level of the virtual item, in accordance with one or more implementations.

FIG. 4 illustrates an upgrade interface 400 configured to enable a user to manage upgrading a virtual item, wherein the upgrade interface 400 may present a display panel 402 in the active state corresponding to some other item level of the virtual item, in accordance with one or more implementations. As depicted in FIG. 4, upgrade interface 400 also may present one or more display panels in the inactive state corresponding to one or two next item levels (display panels 404 and 406), a current item level (display panel 408), and/or other item levels (display panel 410) besides the current item level. The upgrade interface 400 may be presented to the user via a client computing platform 104 associated with the user. The upgrade interface 400 may be presented within a virtual space provided by server 102, another virtual space, and/or outside of a virtual space. The upgrade interface 400 may be provided by upgrade interface module 118 and/or other modules of system 100. The depiction of user interface 400 in FIG. 4 is not intended to be limiting as user interface 400 may include more or less elements than those shown.

As depicted in FIG. 4, display panel 402 may include one or more of a level of benefit field 412, a virtual cost to increment field 414, intervening item level information field 416, and/or other elements. The level of benefit field 412 may be configured to present a level of the benefit parameter associated with the item level that corresponds to display panel 402. The virtual cost to increment field 414 may be configured to present a virtual cost for incrementing the item level of the virtual item from the current item level to the item level associated with display panel 402, including any intervening item levels. The intervening item level information field 416 may be configured to present information associated with one or more intervening item levels between the current item level and the item level associated with display panel 402.

Figure 5:
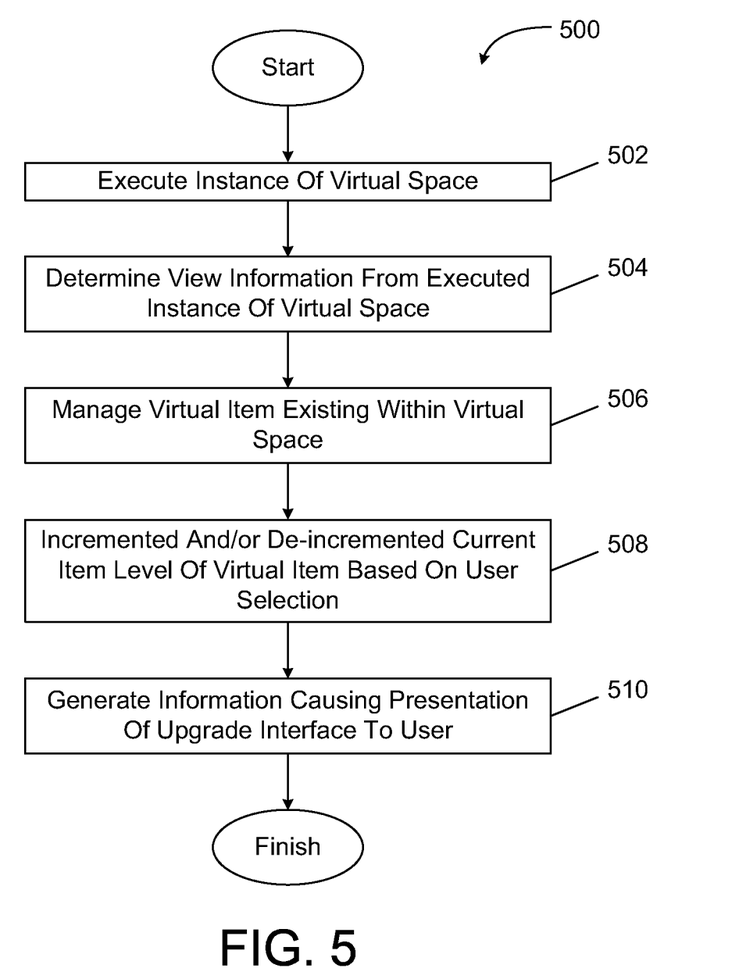
FIG. 5 illustrates a method of presenting an intuitive interface to a user for upgrading a virtual item, in accordance with one or more implementations.

FIG. 5 illustrates a method 500 of presenting an intuitive interface to a user for upgrading a virtual item, in accordance with one or more implementations. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

In some implementations, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, an instance of a virtual space may be executed. Operation 502 may be performed by a user module that is the same as or similar to user module 106, in accordance with one or more implementation.

At an operation 504, view information may be determined from the executed instance of the virtual space. The view information may define a view of the virtual space for presentation to a user. Operation 504 may be performed by a user module that is the same as or similar to user module 106, in accordance with one or more implementation.

At an operation 506, a virtual item that exists within the virtual space may be managed. The virtual item may be associated with the user and may provide the user with a benefit within the virtual space. The virtual item may have discrete item levels where a benefit parameter of the benefit provided by the virtual item varies as a function of a current item level of the virtual item. According to some implementations, managing the virtual item may comprises (1) tracking the current item level of the virtual item, and (2) ensuring that the benefit is provided to the user in accordance with the current item level of the virtual item. Operation 506 may be performed by an item level module that is the same as or similar to item level module 114, in accordance with one or more implementations.

At an operation 508, the current item level of the virtual item may be incremented and/or de-incremented based on user selection. Operation 508 may be performed by an item upgrade module that is the same as or similar to item upgrade module 116, in accordance with one or more implementations.

At an operation 510, information may be generated causing presentation of an upgrade interface to the user. The upgrade interface may be configured to receive selection by the user that results in the incrementing and/or de-incrementing the current item level. The upgrade interface may present a series of display panels with individual display panels corresponding to individual levels of the virtual item. The individual display panels may have an active state and an inactive state. The upgrade interface may be further configured such that only one of the display panels is in the active state at a given time, and such that responsive to one of the display panels in the inactive state being selected the selected display panel enters the active state. Operation 510 may be performed by an upgrade interface module that is the same as or similar to upgrade interface module 118, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A computer-implemented method of presenting an intuitive interface to a user for upgrading a virtual building, wherein the method is implemented in a computer system comprising one or more processors configured by machine-readable instructions, the method comprising:

executing an instance of a virtual space;

determining view information from the executed instance of the virtual space, wherein the view information defines a view of the virtual space for presentation to a user;

managing a virtual building that exists within the virtual space that is associated with the user, wherein the virtual building provides the user with one of more benefits within the virtual space that are defined by at least one benefit parameter, the virtual building having a plurality of discrete benefit levels, wherein each benefit level corresponds to different parameter values for the at least one benefit parameter information causing presentation of an upgrade interface to the user comprising a plurality of display panels, with individual display panels corresponding to different benefit levels of the virtual building, wherein the individual display panels have an active state and an inactive state, wherein only one of the plurality of display panels is in the active state at a given time, wherein the virtual building is configured to have a current benefit level that corresponds to the display panel that is in the active state, wherein the current benefit level is a first benefit level and the active panel is a first display panel; and increment or decrement the first benefit level of the virtual building in response to a user activation of a second display panel of one of the plurality of display panels in the inactive state that corresponds to a second benefit level, wherein the second display panel becomes the display panel in the active state, and the current benefit level of the virtual building is incremented or decremented to correspond to the second benefit level.

2. The method of claim 1, wherein the upgrade interface is further configured such that a transition from the inactive state to the active state by a given display panel causes presentation in the given display panel of a level associated with the benefit level that corresponds to the given display panel.

3. The method of claim 1, wherein the upgrade interface is further configured such that a transition from the inactive state to the active state by a given display panel causes presentation in the given display panel of a field configured to receive user selection, resulting in the incrementing and/or de-incrementing the current benefit level of the virtual building.

4. The method of claim 1, wherein the upgrade interface is further configured such that a transition from the inactive state to the active state by a display panel corresponding to a next benefit level adjacent to the current benefit level causes presentation in the display panel of a virtual cost for incrementing the benefit level of the virtual building from the current benefit level to the next benefit level.

5. The method of claim 4, wherein incrementing the current benefit level of the virtual building comprises obtaining the virtual cost from the user in the virtual space.

6. The method of claim 4, wherein the virtual cost is payable in one or more of time, virtual currency, and virtual goods.

7. The method of claim 4, wherein the virtual cost is payable in either time or virtual currency, and wherein the upgrade interface is configured such that the display panel corresponding to the next level facilitates selection by the user of paying the virtual cost in time or virtual currency.

8. The method of claim 1, wherein the upgrade interface is further configured such that the display panels correspond to the current benefit level and a series of benefit levels associated with the benefit to be provided and/or accrue to the user at a greater rate than with the current benefit level.

9. The method of claim 1, wherein the benefit associated with the benefit levels comprises one or more of a rate at which the benefit is provided and/or accrues to the user in the virtual space, an impact on a cost of the benefit to the user in the virtual space, and an effectiveness of the benefit in the virtual space.

10. A system configured to present an intuitive interface to a user for upgrading a virtual building, the system comprising:
one or more processors configured by machine-readable instructions to:
execute an instance of a virtual space, and to determine view information from the executed instance of the virtual space, wherein the view information defines a view of the virtual space for presentation to a user;
manage a virtual building that exists within the virtual space that is associated with the user, wherein the virtual building provides the user with one or more benefits within the virtual space that are defined by at least one benefit parameter, the virtual building having a plurality of discrete benefit levels, wherein each benefit level corresponds to different parameter values for the at least one benefit parameter; generate information causing presentation of an upgrade interface to the user comprising a plurality of display panels, with individual display panels corresponding to different benefit levels of the virtual building, wherein the individual display panels have an active state and an inactive state, wherein only one of the plurality of display panels is in the active state at a given time, wherein the virtual building is configured to have a current benefit level that corresponds to the display panel that is in the active state, wherein the current benefit level is a first benefit level and the active panel is a first display panel; and
increment or decrement the first benefit level of the virtual building in response to a user activation of a second display panel of one of the plurality of display panels in the inactive state that corresponds to a second benefit level, wherein the second display panel becomes the display panel in the active state, and the current benefit level of the virtual building is incremented or decremented to correspond to the second benefit level.

11. The system of claim 10, wherein the one or more processors are further configured by machine-readable instructions such that a transition from the inactive state to the active state by a given display panel causes presentation in the given display panel of a level associated with the benefit level that corresponds to the given display panel.

12. The system of claim 10, wherein the one or more processors are further configured by machine-readable instructions such that a transition from the inactive state to the active state by a given display panel causes presentation in the given display panel of a field configured to receive user selection, resulting in incrementing and/or de-incrementing the current benefit level.

13. The system of claim 10, wherein the one or more processors are further configured by machine-readable instructions such that a transition from the inactive state to the active state by a display panel corresponding to a next benefit level adjacent to the current item level causes presentation in the display panel of a virtual cost for incrementing the benefit level of the virtual building from the current benefit level to the next benefit level.

14. The system of claim 13, wherein the one or more processors are further configured by machine-readable instructions such that incrementing the current benefit level of the virtual building comprises obtaining the virtual cost.

15. The system of claim 13, wherein the virtual cost is payable in one or more of time, virtual currency, or virtual goods.

16. The system of claim 13, wherein the virtual cost is payable in either time or virtual currency, and wherein the one or more processors are further configured by machine-readable instructions such that the display panel corresponding to the next benefit level facilitates selection by the user of paying the virtual cost in time or virtual currency.

17. The system of claim 10, wherein the one or more processors are further configured by machine-readable instructions such that the display panels correspond to a current building level and a series of benefit levels that cause the benefit to be provided and/or accrue to the user at a greater rate than the current benefit level.

18. The system of claim 10, wherein the benefit comprises one or more of a rate at which the benefit is provided and/or accrues to the user in the virtual space, an impact on a cost of the benefit to the user in the virtual space, or an effectiveness of the benefit in the virtual space.

* * * * *